(12) United States Patent
Wenzel

(10) Patent No.: US 10,442,996 B1
(45) Date of Patent: *Oct. 15, 2019

(54) PRODUCTION AND USE OF ULTRA-CLEAN CARBON COMPOUNDS AND UNIFORM HEAT FROM CARBON-BASED FEEDSTOCKS

(71) Applicant: Saga Fuel Systems, Inc., Sparta, NJ (US)

(72) Inventor: Deborah Wenzel, Sparta, NJ (US)

(73) Assignee: SAgA Fuel SYSTEMS, INC., Sparta, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/105,654

(22) Filed: Aug. 20, 2018

Related U.S. Application Data

(63) Continuation-in-part of application No. 15/688,625, filed on Aug. 28, 2017, now Pat. No. 10,053,629.

(60) Provisional application No. 62/379,971, filed on Aug. 26, 2016, provisional application No. 62/385,737, filed on Sep. 9, 2016.

(51) Int. Cl.

| | |
|---|---|
| *C10B 53/07* | (2006.01) |
| *C01B 32/50* | (2017.01) |
| *C01F 17/00* | (2006.01) |
| *B01D 53/02* | (2006.01) |
| *B01D 53/50* | (2006.01) |
| *B01D 53/78* | (2006.01) |
| *B01D 53/75* | (2006.01) |
| *B01D 53/86* | (2006.01) |
| *B01D 53/34* | (2006.01) |
| *C10B 57/00* | (2006.01) |
| *C10B 57/16* | (2006.01) |
| *C10J 3/84* | (2006.01) |

(52) U.S. Cl.
CPC .............. *C10B 53/07* (2013.01); *B01D 53/02* (2013.01); *B01D 53/343* (2013.01); *B01D 53/502* (2013.01); *B01D 53/507* (2013.01); *B01D 53/75* (2013.01); *B01D 53/78* (2013.01); *B01D 53/8625* (2013.01); *C01B 32/50* (2017.08); *C01F 17/0006* (2013.01); *C10B 57/005* (2013.01); *C10B 57/16* (2013.01); *C10J 3/84* (2013.01); *B01D 2251/404* (2013.01); *B01D 2251/60* (2013.01); *B01D 2251/70* (2013.01); *B01D 2253/102* (2013.01); *B01D 2256/16* (2013.01); *B01D 2256/22* (2013.01); *B01D 2257/302* (2013.01); *B01D 2257/404* (2013.01); *B01D 2257/504* (2013.01); *B01D 2257/602* (2013.01); *C01B 2210/0006* (2013.01); *C01B 2210/0075* (2013.01); *C01P 2006/80* (2013.01); *C10J 2300/0946* (2013.01); *C10J 2300/1612* (2013.01); *C10J 2300/1637* (2013.01)

(58) Field of Classification Search
CPC ......... C07C 1/0485; C07C 11/02; C07C 1/04; C01B 3/02; C01B 31/20; C01B 32/50; C10B 49/20; C10B 53/02; C10B 49/08; C10B 53/00; C10B 53/07; C10L 1/1824; B01D 2257/504; G10L 21/0208; G10L 25/00; Y02P 10/214; Y02P 20/143
See application file for complete search history.

(56) References Cited

U.S. PATENT DOCUMENTS

| | | | |
|---|---|---|---|
| 4,153,514 A * | 5/1979 | Garrett | ................... C10B 49/08 201/12 |
| 4,358,344 A | 11/1982 | Sass et al. | |
| 8,822,553 B1 * | 9/2014 | Wenzel | ................... C01B 3/02 48/197 R |
| 9,334,796 B2 | 5/2016 | Wenzel | |
| 2004/0099095 A1 | 5/2004 | Minter | |
| 2011/0132737 A1 | 6/2011 | Jadhav | |

OTHER PUBLICATIONS

Barnes, A., "Ash Utilisation from Coal-Based Power Plants," Dec. 2004, Report No. COAL R274 DTI/Pub URN Apr. 1915; 25 pages.

* cited by examiner

*Primary Examiner* — Sharon Pregler

(57) ABSTRACT

Ultra-clean char and ultra-clean gaseous hydrocarbons are produced from a carbon-based feedstock to generate maximum efficiency uniform heat and/or electricity in a clean environmentally friendly process. The ultra-clean char and ultra-clean gaseous hydrocarbon streams are produced by pyrolizing organic matter, such as coal or pet coke or any other carbon-based material including land, sea, plastics and industrial waste. The pyrolized organic matter may be combusted in the presence of oxygen to produce heat, which can be used to generate electricity in a conventional boiler/generator system. Further, pyrolized organic matter can be combusted in the presence of carbon dioxide and further processed to produce various hydrocarbons. In other embodiments, the ultra-clean post-combustion ash may be subjected to an extraction process for capturing valuable rare earth elements.

28 Claims, 11 Drawing Sheets

PRODUCTION AND USE OF ULTRA-CLEAN CARBON COMPOUNDS AND UNIFORM HEAT FROM CARBON-BASED FEEDSTOCKS

RELATED APPLICATIONS

This application is a continuation-in-part of U.S. patent application Ser. No. 15/688,625 filed Aug. 28, 2017, which claims priority from U.S. Provisional Patent Application Ser. No. 62/379,971 filed Aug. 26, 2016, and U.S. Provisional Patent Application Ser. No. 62/385,737 filed Sep. 9, 2016. The disclosures of each of these applications are incorporated herein by reference.

FIELD OF THE INVENTION

Embodiments of the present invention relate to pyrolizing carbon feedstocks to create ultra-clean char, ultra-clean gaseous hydrocarbons, ultra-clean carbon dioxide, ultra-clean ash; uses for such char, gaseous hydrocarbons, carbon dioxide, and ash; and uniform heat generation from carbon-based feedstocks.

BACKGROUND OF THE INVENTION

Current practices related to coal processing for heat and energy production perform at varying levels of efficiency and also produce unacceptable levels of noxious exhaust emissions. Efficiency levels can be adversely affected according to coal grade availability and unacceptable emissions from any coal grade include nitrogen oxides, sulfur oxides, gaseous mercury, soot and high levels of variously contaminated carbon dioxide.

The combination of these various inefficiencies associated with current coal industry practices has created such extreme conditions that many coal processing facilities have been forced to cease operating, a situation that has created many downstream negative affects including severe loss of industry revenue, loss of employment opportunities in not only coal processing industries but also mining operations, as well as an overall reduction in available energy resources both domestically and internationally. All of this occurring at a time when the combustion of raw coal to generate electricity is especially needed to supply the increasing demands of the global economy.

Another use for raw coal is the production of liquid hydrocarbon fuels using the Fischer-Tropsch coal-to-liquid fuel ("FTCTL") process, by which coal is converted from its raw state into liquid forms by breaking down the coal to a first product building block (carbon monoxide) through partial combustion in a low-oxygen atmosphere, followed by a series of catalytic reactions to convert the carbon monoxide with hydrogen to liquid hydrocarbons. The FTCTL process, however, is also only variously efficient depending on available coal grades and is known to produce unacceptable levels of exhaust emissions that include nitrogen oxides, sulfur oxides, gaseous mercury, soot, fine and less fine particulate matter, and high levels of variously contaminated carbon dioxide.

Current methods for coal processing have varying levels of heat efficiency produced by differing grades of mined coal. While anthracite and bituminous coal are now preferred as heat-producing feedstocks, lignite reserves are currently mined to a limited extent because heat value versus waste (solid, liquid and gaseous) is not sufficient to justify full-scale mining and use of lignite coal for heat and power generation.

A problem associated with current methods for coal processing is the industry's inability to make use of other feedstocks which could significantly increase the energy production yield from existing coal processing facilities. Other carbon-based feedstocks which could provide very high heat efficiency for energy production include landwaste, seawaste, industrial waste, plastics waste and petroleum coke ("pet coke"). Current practices in which raw feedstocks are combusted produce unacceptable levels of exhaust pollutants such as nitrogen oxides, sulfur oxides, gaseous mercury, soot, fine and less fine particulate matter, and variously contaminated carbon dioxide, which all require very expensive and variously insufficient post-combustion exhaust stream scrubbing and prohibitively expensive removal of other waste streams. Another problem associated with the possible use of land, sea, industrial, plastic waste and pet coke are the widely varying levels of heat available from the burning of these materials in their raw state.

Current methods for coal processing also have unpredictable levels of contamination of the final exhaust product, carbon dioxide. Even with current exhaust scrubbing mechanisms, contamination levels are often unacceptably high (especially nitrogen oxide levels) as is the expense associated with soot accumulation in scrubbing and/or catalytic conversion mechanisms.

While there are potential uses for carbon dioxide which include sequestering and recently discovered methods for recirculating to produce liquid hydrocarbon fuel, any level of contamination in the final carbon dioxide exhaust stream impedes its reactivity level and resulting efficient use.

Yet another efficiency problem associated with current coal processes is the very low extraction rate of rare earth elements such as scandium, yttrium, lanthanum and cerium from slag and ash residue left following coal combustion. Current methods for extraction, at their very best, result in only about 2% extraction rate of rare earth elements from coal-derived ash and slag. Because there are important uses for these elements in the health care, transportation and electronics industries as well as military use, inefficient extraction processes involving ash and slag is a missed opportunity.

Prior art developments intended to improve coal process efficiency levels include fuel cell technologies designed to augment heat value from coal processes without increasing exhaust and waste streams. Post-combustion scrubbing technologies are continually being developed to improve scrubbing efficiency, especially pertaining to soot trapping and removal of excess soot from scrubbing and catalytic converter mechanisms. Coal gasification is another method intended to improve efficiency levels of heat production from coal while reducing exhaust pollutants. Other prior art methods for improving coal process efficiency involve developments in surfactant technologies which are used to extract rare earth elements from coal-derived post-combustion slag and ash.

Two prior art systems are described in U.S. Pat. Nos. 8,822,553 and 9,334,796 in which coal in the first patent, or any carbon-based material in the second patent, are converted to fuel through processes that first produce heat (and electricity according to the second patent) and carbon dioxide ($CO_2$). The carbon dioxide is then recirculated and reacted with carbon black or coke (C) to produce carbon monoxide (CO). The carbon monoxide resulting from the reaction of carbon dioxide and carbon black is then further reacted with hydrogen ($H_2$) produced by or from several possible reactions or sources to form liquid hydrocarbon fuel according to FTCTL practices.

Thus, the prior art describes systems by which coal or a carbon-based material can be used to produce fuel by first generating heat (and electricity) and carbon dioxide from the coal or carbon-based material and recirculating the carbon dioxide to react with carbon black to form carbon monoxide, which is then reacted with hydrogen to form liquid hydrocarbon fuels. These systems address the problem of excessive carbon dioxide emissions from the combustion of coal or a carbon-based material by converting the coal or carbon-based materials to fuel. While these processes address the problem of carbon dioxide exhaust as an undesirable final product from coal or carbon-based material processing, they are specifically linked to carbon dioxide recirculation and fuels production and do not address the many other problems associated with current coal processing methods described above.

SUMMARY OF THE INVENTION

The present invention introduces a shift from the prior art systems, through which a series of unexpected and dramatic improvements are possible. While it was understood that pyrolization of low-grade coal (and, later, any carbon-based material) was a preferred method for producing carbon black or coke (C) for later conversion to carbon monoxide (CO) and further reaction with hydrogen ($H_2$) to produce liquid hydrocarbon fuels, the prior art relies on combustion of coal (or another carbon-based material) to yield first products heat, electricity and carbon dioxide.

In the prior art two reactive systems are described: one by which carbon black is produced through pyrolization of coal or a carbon-based material, and the other by which heat, electricity and carbon dioxide are produced through combustion of coal or a carbon-based material. Separating the two functions in this way appeared to be the most efficient method for producing both the carbon black or coke needed for the overall system and for immediately accessing heat, electricity and carbon dioxide from the coal or other carbon-based materials.

The present invention obtains surprising results when all materials for all functions are first pyrolized and no materials are directly combusted in their raw state. At first it seemed this shift might require an unacceptable level of initially-required heat to accomplish pyrolization (which is significantly endothermic) for all carbon-based feedstock materials within the system, and would introduce an unproductive first step for those materials for which the intended first function was to actually yield heat, as well as electricity and carbon dioxide. It was discovered that the shift to pyrolizing all carbon-based feedstocks as a first step in the energy-production process would lead to multiple overall reactive improvements throughout successive steps in the entire system. Pyrolization of all feedstocks to produce a first product carbon black, coke, or "ultraclean char" (C) had the downstream effect of producing significant cumulative efficiency improvements, so that the revised system had value whether the system was used to produce liquid fuel as an end product or not.

The first improvement associated with the shift to pyrolizing all carbon-based feedstock materials as the first step in the energy-production system is that no differentiation is needed in determining which feedstock is used for which purpose. All carbon-based feedstocks are first pyrolized to produce ultra-clean char (carbon black, coke, C) whether the char is intended for combustion to produce heat, electricity and carbon dioxide ($CO_2$), or for reaction with carbon dioxide ($CO_2$) to produce carbon monoxide (CO) for further processing to yield liquid hydrocarbon fuels.

A second improvement associated with the shift to pyrolizing all carbon-based feedstock materials as the first step in the energy-production system is that all feedstocks may be either singularly processed (for instance bituminous coal by itself) or processed as a mixture (unseparated bituminous coal and lignite coal, for example) and still yield uniformly clean, uniform heat (BTU) yielding ultra-clean char. The uniformity of this ultra-clean char and the potential for non-differentiated feedstock use extends to all other carbon-based feedstock materials such as landwaste, seawaste, plastic waste, and industrial waste including petroleum coke or pet coke.

Further details associated with combined feedstock processing were obtained through testing. All tests were based on the use of three carbon-based feedstocks, namely bituminous coal, lignite coal and pet coke. During those tests it became clear that varying feedstocks would have varying characteristics according to the chemical composition of the feedstock. For instance, petroleum coke has a very high sulfur content, much higher than any grade of coal. Pet coke also has a lower liquid or semi-liquid volatile hydrocarbon, oil and tar content than coal, as these materials would previously have been distilled out of the pet coke during standard petroleum processing.

During pyrolization tests, then, the diameter of the tubing for liquid and semi-liquid waste removal had to be increased to accommodate the copious flow of sulfur extruding from the pet coke. On the other hand, the lighter concentration (compared to bituminous and lignite coal) of volatile hydrocarbons, oils and tars from sorbent beds suggest that less solvent (by weight or volume), or a less strong solvent, may be required for effective waste removal of those types of compounds from pet coke than those needed for various grades of coal.

Combined feedstocks, for instance a combination of varying grades of coal and pet coke, mixed in any given proportion, will require pre-testing to determine exactly what extraction equipment and exactly what extraction solvents work most effectively for any given pure or mixed carbon-based feedstock stream.

Lighter grade feedstocks, for instance certain grades of plastics waste, can be expected to require lower pyrolization temperatures than any grade of coal or pet coke and still achieve clean pyrolization and combustion results. Pyrolization temperatures for lightweight plastics could be as low as 100° C. or within the range of 100-600° C. Sulfur and mercury would not be present at all in some grades of plastic and so sulfur or mercury removal would not be required. The same is true of volatile liquid hydrocarbons, oils and tars. In lightweight plastics these waste materials can be expected to be significantly less dense than what is present and extruded from coals and pet coke, and thus require lower pyrolization temperatures and/or less concentrated impurity extraction methods.

On the other hand, certain other carbon-based feedstocks such as very heavy mixed industrial waste (used road tires, for instance, or certain grades of land and sea waste) can be expected to have very dense concentrations of impurities such as sulfur, mercury, liquid, semi-liquid and semi-solid volatile hydrocarbons, oils and tars. Processing of these types of feedstocks may require pyrolization temperatures ranging from 1200-2400° C. to effectively remove impurities. Solvents required to extract waste materials from sorbent beds or other impurity removal equipment may be many times stronger or at higher concentrations than those demonstrated to be effective in the production of ultra-clean char, ultra-clean gaseous hydrocarbons, ultra-clean $CO_2$, uniform heat and ultra-clean ash from varying grades of coal and/or pet coke.

It is important to understand that mixtures of any grade of any carbon-feedstock, however light or dense, pure or impure, can be pyrolized in any combination to yield ultra-clean char, gaseous hydrocarbons, $CO_2$, post-combustion ash and uniform heat. The only requirement is that representative samples must first be pre-tested to determine most efficient feedstock pretreatment (washing, drying, pelletizing and combining, for instance) pyrolization temperatures (ranging anywhere from 100°–2400° C.), waste removal equipment (for example: waste collection pipes or tubing, sorbent beds, sparges, catalytic converters) and most effective solvent strengths and concentrations for extraction and removal of waste materials once they have been captured or collected.

Another improvement associated with the shift to pyrolizing all carbon-based feedstock materials as the first step in the energy-production system is that all waste products are collected and processed before combustion, and are therefore processed as hydrogen- or nitrogen-bonded gaseous material, or as liquid or solid material for which there are many potential industrial uses, but never as a part of the post-combustion exhaust stream, thereby eliminating the need for exhaust stream scrubbing.

Further details associated with waste processing were obtained during testing. During pyrolization and subsequent combustion tests, the following additions and improvements to waste stream processing were discovered:

1) Liquid and semi-liquid waste were collected from bituminous and lignite coal and pet coke in the form of volatile hydrocarbons, oils and tars by first condensing the liquid and semi-liquid waste stream through cooling in ice (0° C.) water.
2) The condensed liquid and semi-liquid materials were then captured using an activated carbon sorbent bed and a solvent was used to extract the volatile hydrocarbons, oils and tars from the sorbent bed.
3) Although many different industrial solvents may be used, the solvent used during pyrolization testing to extract the waste materials from the sorbent bed was carbon disulfide ($CS_2$).
4) It was additionally discovered that the semi-liquid waste from pet coke contained less volatile hydrocarbons, tars and oils than bituminous and lignite coal, but also contained about 11% solid materials in the form of elemental and organic sulfur.
5) Following extraction from sorbent beds, liquid and semi-liquid waste from bituminous and lignite coal and pet coke may be further processed through distillation, hydrotreatment or co-pyrolysis with coal for industrial use. Organic and elemental sulfur are precipitated out and have many industrial uses.

Additional discoveries were made during the tests concerning the processing of the gaseous stream during pyrolysis in which it was earlier thought that only hydrogen- or nitrogen-bonded waste materials would release during pyrolization of the carbon-based feedstocks.

As the gaseous stream was subsequently analyzed by gas chromatography (GC), it was discovered that a significant portion of the available hydrogen had bonded with a measurable portion of the available carbon to form gaseous hydrocarbons, which are not waste materials at all, but a very useful combustible stream with significant caloric (heat) value.

It was also discovered that all the sulfur present in the bituminous and lignite coal and a portion of the sulfur present in pet coke had bonded with the oxygen naturally present in the coal and/or pet coke to form sulfur oxides or had, bonded with a portion of the hydrogen naturally present in the coal and/or pet coke to form hydrogen sulfide.

It was further discovered that mercury had sublimated during pyrolization and was present in the gaseous waste stream as gaseous mercury. Nitrogen was also significantly present in the gaseous waste stream from bituminous and lignite coal and pet coke, but no measurable nitrogen oxides were present at all. This indicates that all available oxygen naturally present in the coal and/or pet coke feedstocks bonded with sulfur, which is many times more reactive than nitrogen, and that no oxygen remained in the gaseous stream from pyrolization to form nitrogen oxides.

The following additions and improvements to the processing of the gaseous waste stream from pyrolization were then implemented:

1) A sparge, or "scrubber," soaked in a redox solution was installed in the gaseous stream collection unit to absorb sulfur oxides. Of the many possible industrially available redox solutions, anthraquinone-2, 7-disulfonic acid disodium salt was used.
2) A second sparge soaked in a lime solution was installed in the gaseous stream collection unit to absorb hydrogen sulfide. The lime solution was 10% lime and 90% deionized water.
3) And third, a sorbent bed was installed to capture any further impurities and gaseous mercury. The sorbent bed was packed with activated carbon.

According to gas chromatography analysis, the result from following the above steps for impurity removal from the gaseous offput from coal and/or pet coke pyrolization is an ultra-clean gaseous hydrocarbon stream with nitrogen present. No measurable sulfur or mercury impurities are present, indicating 99-100% scrubber/sorbent bed efficiency.

With the shift to pyrolizing all carbon-based feedstock materials as the first step in the energy-production system to produce ultra-clean char, the char has reduced impurities which might impede reactivity, will burn at ultra-efficiency to produce the best possible combustive heat from any and all carbon-based feedstocks and, when combusted in the presence of pure oxygen ($O_2$) will yield, not only super-efficient heat, but only ultra-clean carbon dioxide ($CO_2$). There is no soot in this combustion reaction.

Continued tests involved the combustion of all three ultra-clean char samples from bituminous coal, lignite coal and pet coke in pure oxygen.

Although sorbent beds packed with activated carbon were prepared and installed to capture liquid/semi-liquid volatile contaminants from combustion of the ultra-clean char samples, subsequent methods using carbon disulfide ($CS_2$) to extract impurities from the sorbent beds showed no impurities in the sorbent material at all, such that the carbon disulfide solvent remained 100% free of impurities and exhibited a visual quality of being pure 'white,' or absolutely clear liquid.

Gaseous samples from combustion of the ultra-clean char from bituminous and lignite coal and pet coke were analyzed using gas chromatography. Measurable offput gases included oxygen, nitrogen, carbon dioxide, carbon monoxide (a function of incomplete combustion during testing that can be remedied by combusting at a slightly higher temperature or by increasing oxygen content during combustion).

Pure hydrogen was present at less than 0.2%. Gaseous hydrocarbons were present at less than 0.1%. There were no measurable nitrogen oxides, no measurable sulfur oxides, no measurable hydrogen sulfide. There was zero sulfur and no mercury present.

Concurrent combustion of the gaseous hydrocarbon stream from pyrolization, which had previously been shown to contain only ultra-clean gaseous hydrocarbons with nitrogen present can be expected to completely combust with no soot, sulfur or mercury impurities present. The nitrogen present in the gaseous hydrocarbon stream can be expected to form nitrogen oxides. Because the gaseous stream is otherwise entirely devoid of impurities that might impede reactivity, complete removal of nitrogen oxides exhaust through the use of post-combustion catalytic converters can be expected.

In keeping with the ultra-clean results otherwise obtained throughout the pyrolization and combustion tests, standard urea-based (or any other industry standard) post-combustion catalytic converters can be expected to perform at very high (99-100%) rates of efficiency.

In addition, with the shift to pyrolizing all carbon-based feedstock materials as the first step in the energy-production system, the slag and ash as the final product following ultra-clean char combustion will also be ultra-clean. That is not the only improvement. Pyrolization temperatures, which can range from 800°–1200° C. using standard electrical heat, to 2200° C. using induction heating methods and as high as 2400° C. using plasma heating methods, all will yield a more brittle, porous final product ash or slag. That brittle, more porous quality increases efficiency of rare earth element extraction. Whatever extraction methods are used, whether those currently in use (such as washing with non-ionic surfactants) or another method discovered or employed to improve the efficiency of the extraction processes, the pyrolization of the carbon-based material as the first step in the energy-production system further improves extraction efficiency.

Further details associated with rare earth element extraction from ultra-clean ash were obtained during testing. An unexpected improvement demonstrated through testing is that, even before rare earth element extraction methods are employed, the very fact that no impurities remain in the ultra-clean ash following combustion of the ultra-clean char results in higher rare earth concentrations in the ultra-clean ash.

Whereas current Department of Energy and Department of Defense standards recommend that a 300 parts per million concentration of rare earth elements in post-combustion ash is desirable, test results following pyrolization to produce ultra-clean char and subsequent combustion of the ultra-clean char yielded rare earth elements concentrations of between 500 and 550 parts per million. This was, surprisingly, not only true of ultra-clean ash from bituminous and lignite coal, but also true for the ultra-clean ash following petroleum coke char combustion. Thus, what is currently considered to be a very problematic waste accumulation problem in the continental US is instead an untapped mine of very clean heat energy as well as a significant potential source for rare earth element extraction.

The rare earth elements found in the ultra-clean ash following combustion of the ultra-clean char from pyrolization of bituminous coal, lignite coal and pet coke, and may be present in the ultra-clean ash from combustion of ultra-clean char from other carbon-based feedstocks, include but are not limited to: cerium, dysprosium, erbium, europium, gadolinium, lutetium, praseodymium, samarium, terbium, thulium, ytterbium, and yttrium.

Methods for the extraction of rare earth elements from ultra-clean post-pyrolization, post-combustion ash from any carbon-based feedstock include but are not limited to:

1) Pretreatment of the ultra-clean ash using a sodium hydroxide hydrothermal reaction, followed by:

2) Leaching of the rare earth elements from the pretreated ultra-clean char using dilute sulfuric acid ($H_2SO_4$) or hydrochloric acid (HCl) followed by:

3) Extraction of the rare earth elements from the dilute sulfuric acid using a liquid bis(20 ethylhexyl) phosporic acid (D2EHPA), and precipitated out using sodium oxalate, or 4) Extraction of the rare earth elements from the dilute sulfuric acid using an ion exchange resin, such as DOWEX™ 50 WX8 (100-200 mesh) and recovered from the resin using an acid.

DETAILED DESCRIPTION OF THE INVENTION

Definitions

The term "about" means plus or minus 10% of the numerical value of the number with which it is being used. Therefore, about 50% means in the range of 40%-60%.

"Ultra-clean" refers to a product being substantially free of impurities. For example, "ultra-clean char" is herein defined as a post-pyrolyzed organic material being substantially free of impurities. Further, "ultra-clean char" when discussed as resulting from a raw coal product is defined as a post-pyrolyzed coal product containing carbon, aluminum, silica and rare earth elements and being substantially free of impurities.

"Substantially free" is defined as being present in an amount of less than about 20% of the amount originally present. In one embodiment, the ultra-clean char has impurities present in an amount of less than about 15% of their original amounts. In one embodiment, the ultra-clean char has impurities present in an amount of less than about 10% of their original amounts. In one embodiment, the ultra-clean char has impurities present in an amount of less than about 5% of their original amounts. In one embodiment, the ultra-clean char has impurities present in an amount of less than about 2% of their original amounts. In one embodiment, the ultra-clean char has impurities present in an amount of less than about 1% of their original amounts. In one embodiment, the ultra-clean char has impurities present in an amount of less than about 0.5% of their original amounts. In one embodiment, the ultra-clean char has impurities present in an amount of less than about 0.2% of their original amounts.

"Pyrolized" and "pyrolysis" are defined as the thermochemical decomposition of an organic material at elevated temperatures in the absence of oxygen.

Figure 1:
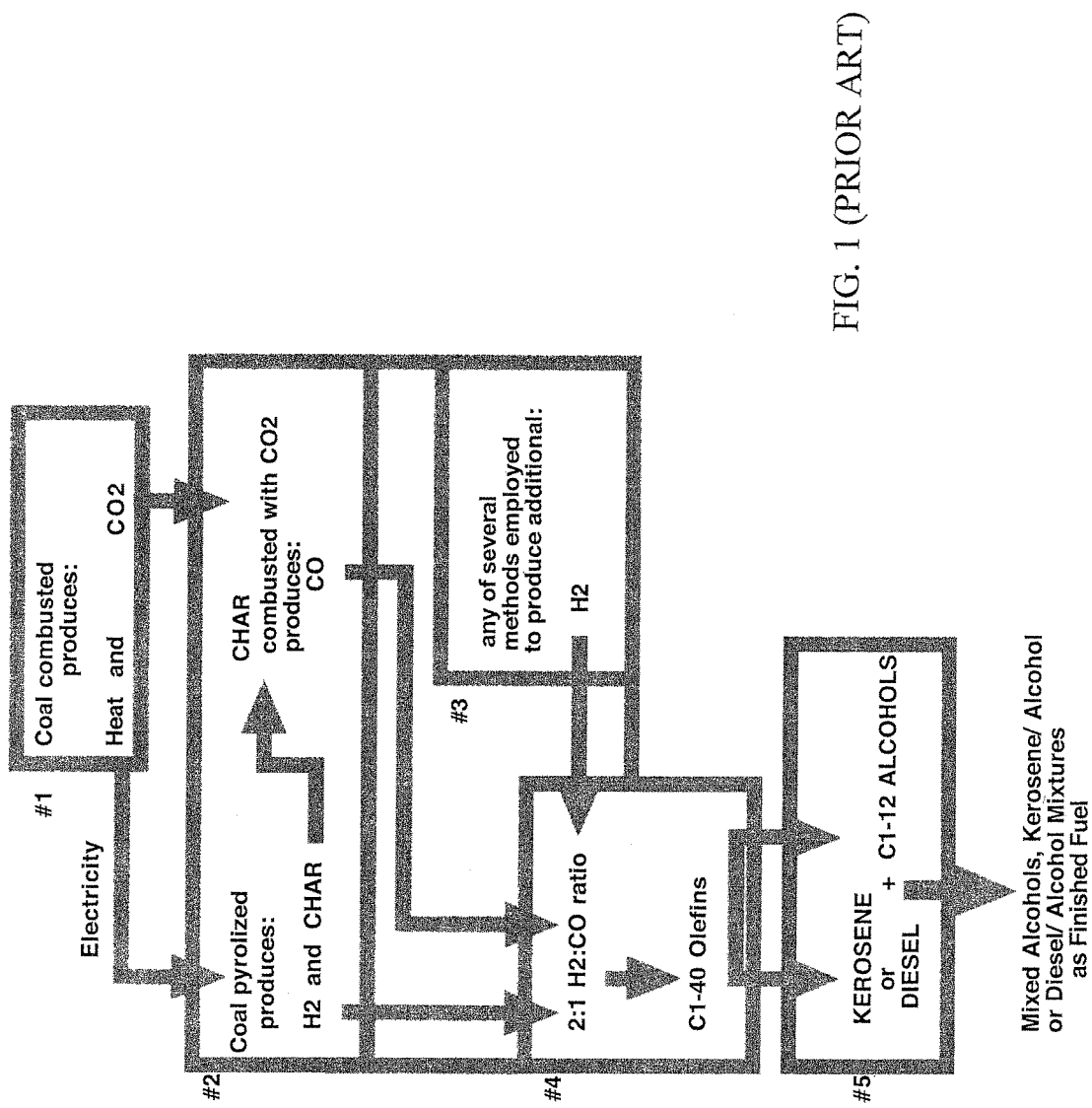
FIG. 1 illustrates the coal to liquid fuel process in U.S. Pat. No. 8,822,553 in which carbon dioxide is recirculated to react with carbon to produce carbon monoxide, which is further reacted with hydrogen to produce liquid hydrocarbon fuels.
Figure 2:
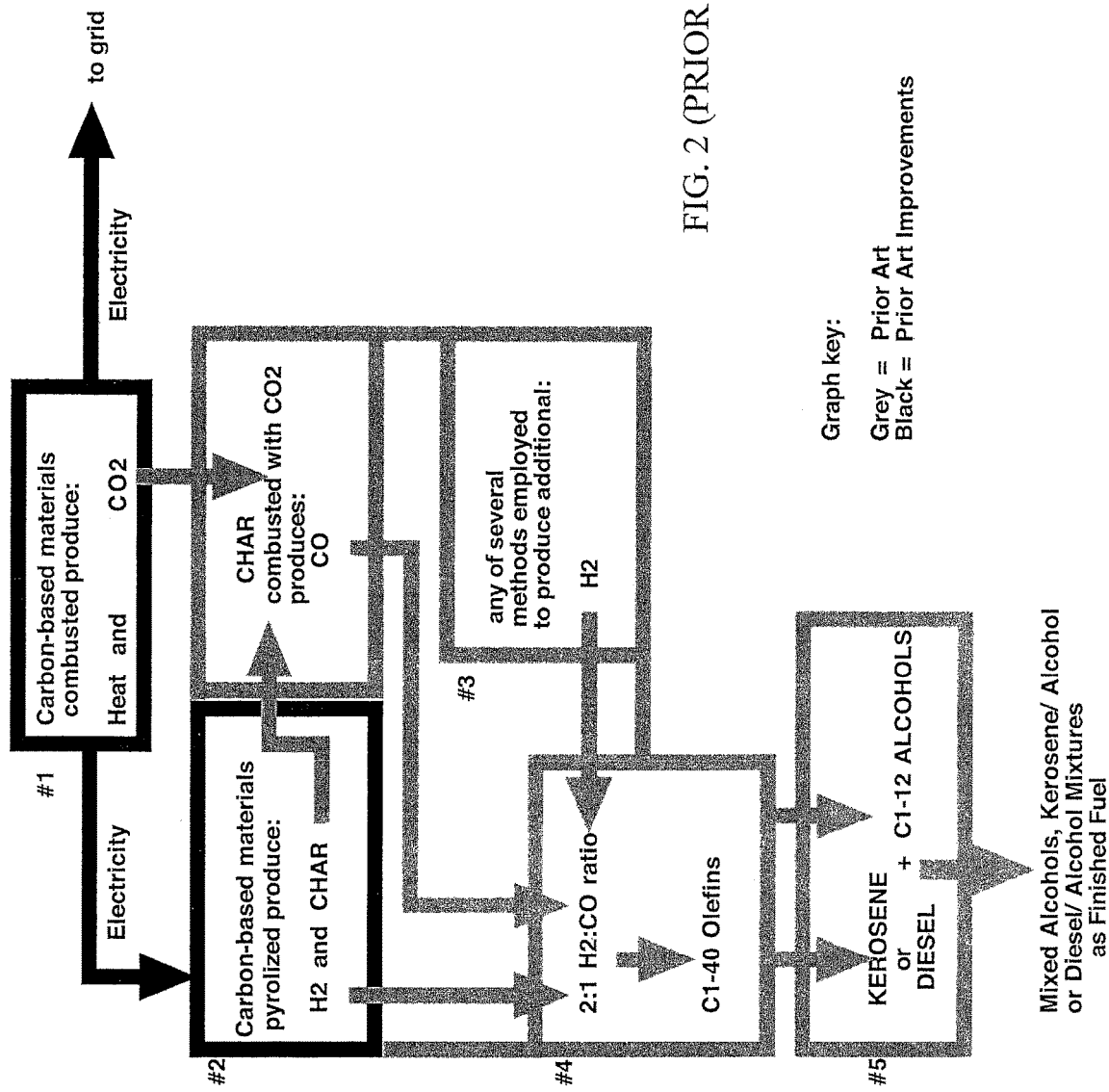
FIG. 2 illustrates the process of U.S. Pat. No. 9,334,796 in which any carbon-based material may be used as feedstock to produce liquid hydrocarbon fuels and generate electricity.

FIGS. 1 and 2 illustrate prior art processes in which the first step is combustion to generate heat and electricity to power the system and create carbon dioxide.

Figure 3:
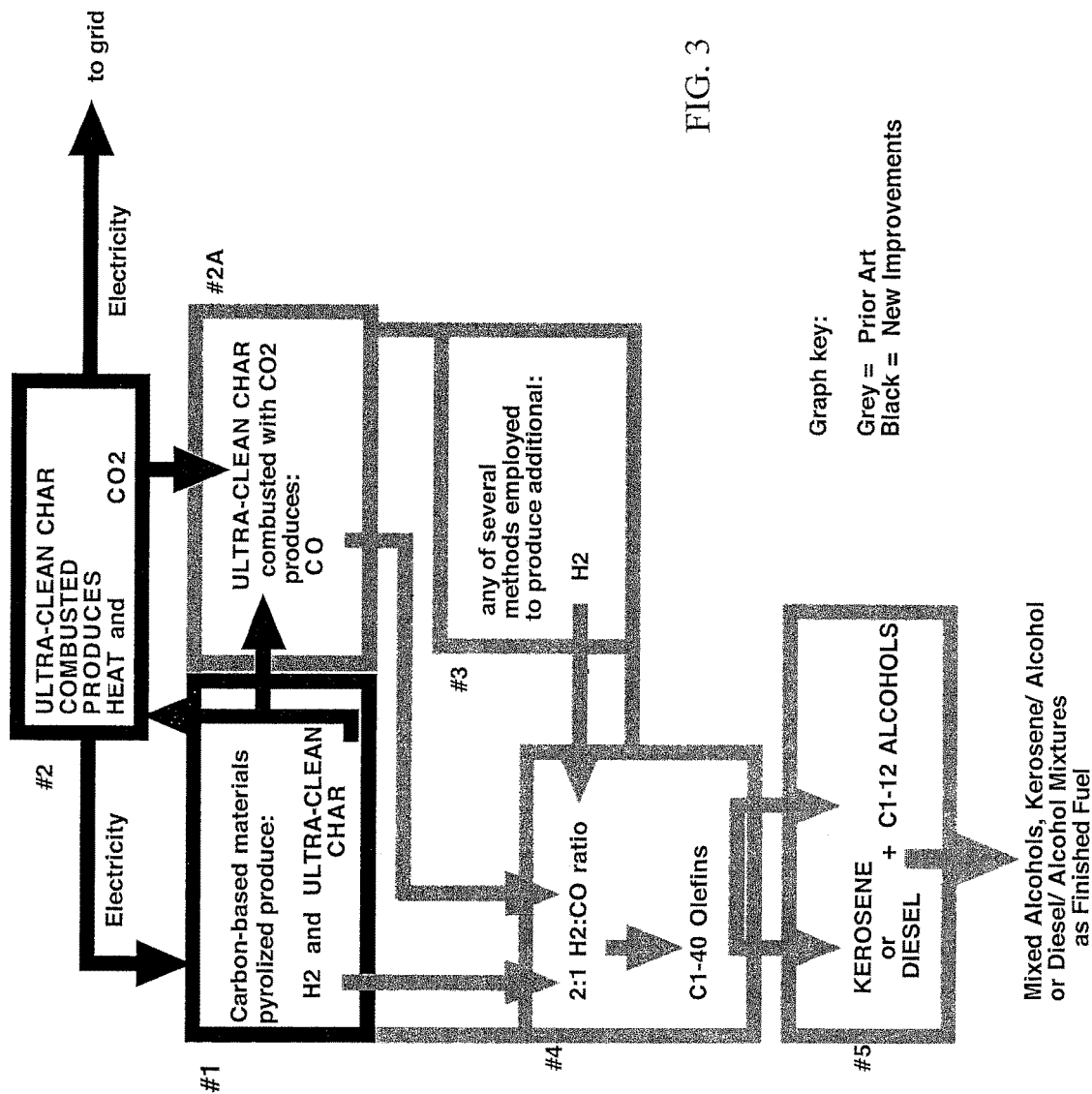
FIG. 3 illustrates the present invention in which all carbon-based materials are pyrolized to form ultra-clean char, or coke, as the first product; no material is combusted in its raw state; and the ultra-clean char, or coke, may be combusted to form heat and/or electricity, or reacted with carbon dioxide to form carbon monoxide which is further processed to yield liquid hydrocarbon fuels.

FIG. 3 illustrates the present invention in which all carbon-based materials are first pyrolized and no materials are combusted in their raw state. In this embodiment, Step 1 and Step 2 of the prior art systems are reversed so that Step 1 involves the pyrolization of any carbon-based material to yield first products hydrogen and carbon, or ultra-clean char, where the hydrogen is used in further downstream reactions and a portion of the carbon or ultra-clean char is combusted in Step 2 to produce heat and electricity sufficient to power the overall system as well as electricity for export to the grid or for other uses, as well as second product carbon dioxide. Step 2A involves the combustion of a portion of the first product carbon or ultra-clean char with recirculated second product carbon dioxide to yield third product carbon monoxide. Steps 3, 4, and 5 use prior art processes to generate hydrocarbon products.

Figure 4:
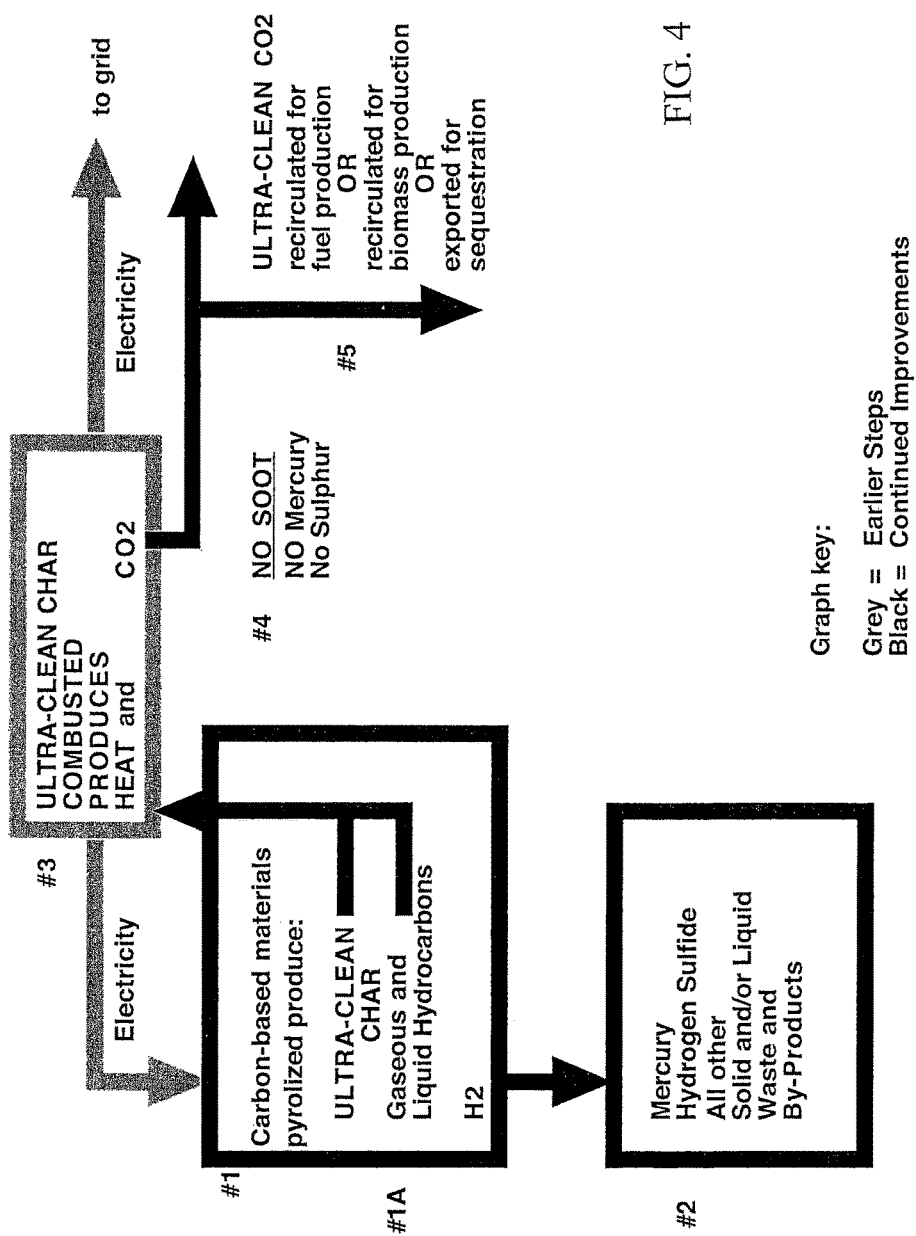
FIG. 4 is illustrates improvements resulting from the shift to pyrolization by which gaseous and liquid hydrocarbons resulting from pyrolization may be used to augment heat and/or electricity production; impurities are removed as liquid or solid by-products or waste following or during pyrolization; the resultant ultra-clean char, or coke, is combusted with the result that reduced soot, mercury, nitrogen, and sulfur are present in the post-combustion exhaust stream; and ultra-clean carbon dioxide may be exhausted into the atmosphere, recirculated for fuel or biomass production, and/or sequestered.

FIG. 4 illustrates improvements of the present invention made possible by pyrolization of all carbon-based materials as Step 1. Step 1A shows the redirection of first products gaseous and liquid hydrocarbons resulting from pyrolysis for combustion to augment heat for the production of electricity and carbon dioxide. Step 2 shows the improvement of removal of impurities during or following pyrolization and prior to combustion. Step 3 describes combustion of ultra-clean char and redirected gaseous and liquid hydrocarbons to yield uniform heat and ultra-clean carbon dioxide. Step 4 shows the absence of soot, mercury or sulfur from the post-combustion exhaust stream, reducing the need to scrub or clean gaseous exhaust. Step 5 describes expanded possibilities for useful recirculation, absorption, or sequestering of all or portions of ultra-clean carbon dioxide.

Figure 5:
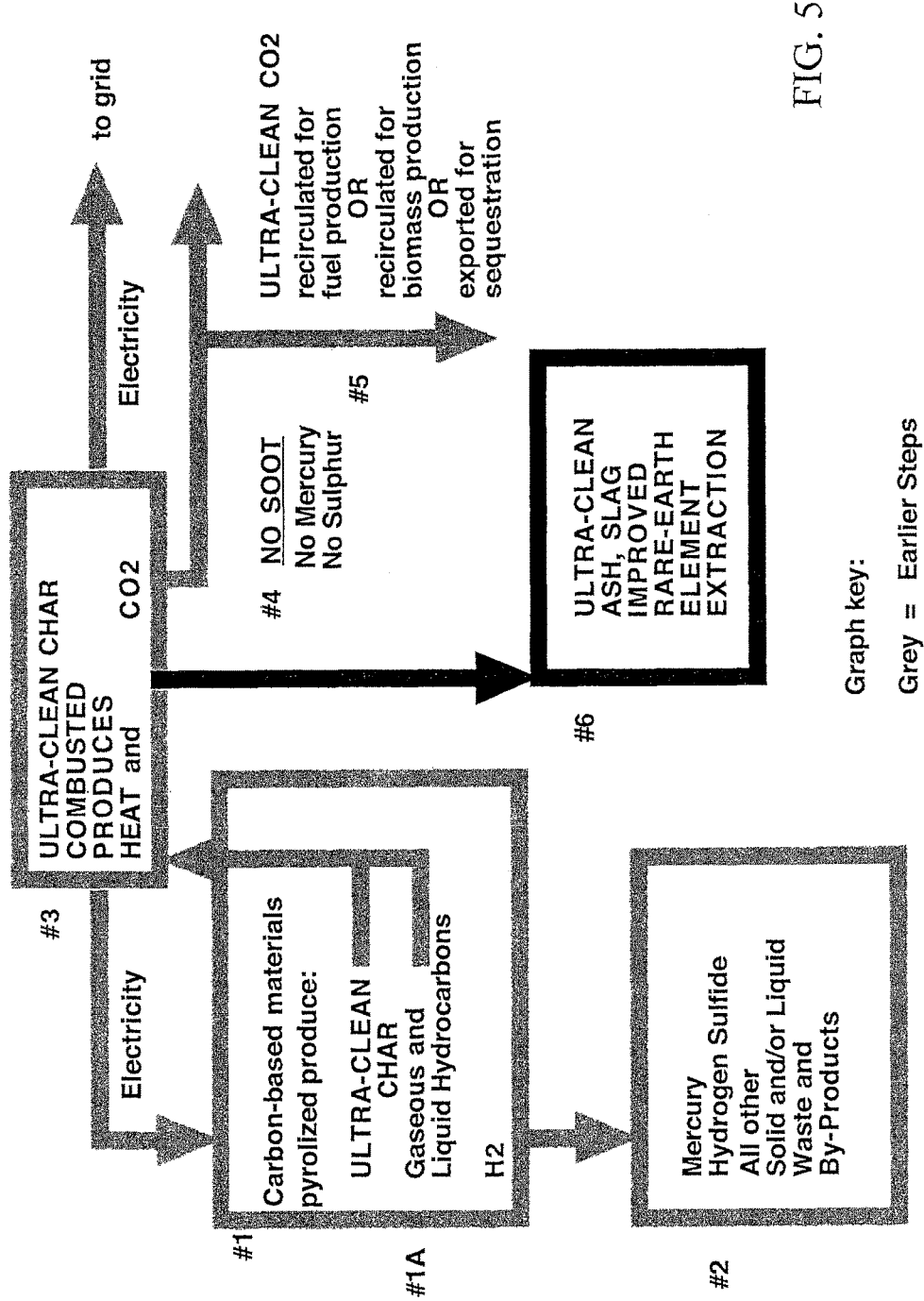
FIG. 5 illustrates further improvements resulting from the shift to pyrolization by which ultra-clean ash and slag are by-products resulting from the combustion of ultra-clean char, or coke, and rare earth element extraction is improved compared to rare earth element extraction from ash and slag produced from the combustion of raw coal or other carbon-based material combusted in its raw state.

FIG. 5 illustrates the further improvement of the present invention made possible by pyrolization of all carbon-based materials as Step 1. While the improvements described in Steps 2, 3, 4, and 5 remain intact, additional Step 6 shows final products ultra-clean ash and slag which allow for improved extraction of rare earth elements, as well as expanded possibilities for the re-use or recycling of ash or slag containing no impurities.

Figure 6:
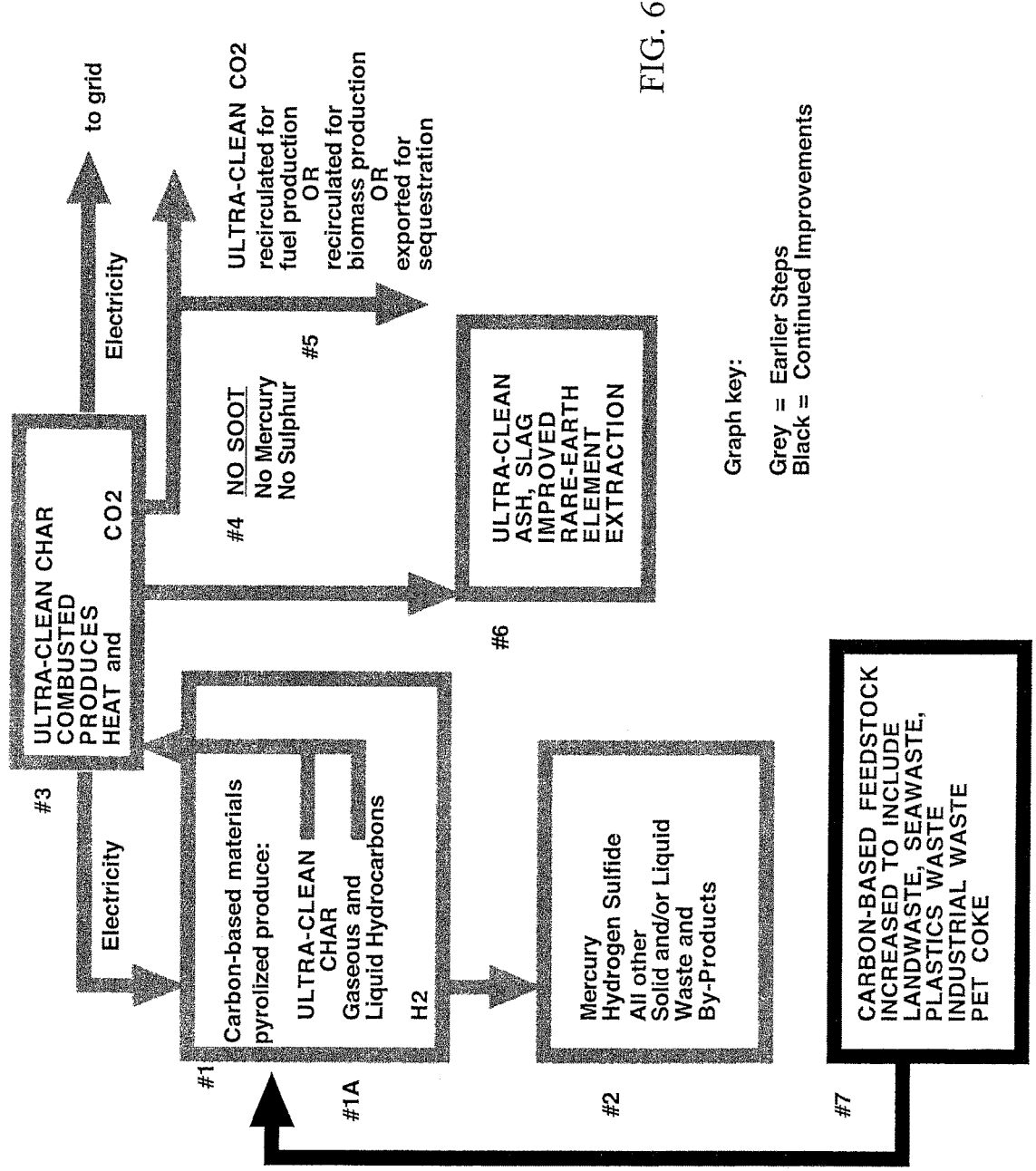
FIG. 6 illustrates further improvements resulting from the shift to pyrolization by which usable carbon-based feedstocks are expanded to include landwaste, seawaste, plastics waste, industrial waste and petroleum coke which otherwise could not be usefully employed as heat-producing sources because of unsatisfactory post-combustion exhaust streams when combusted in their raw state.

FIG. 6 illustrates another improvement of the present invention made possible by pyrolization of all carbon-based materials as Step 1. While the improvements described in Steps 2, 3, 4, 5 and 6 remain intact, additional Step 7 shows the expanded possibilities for use of many different types of raw material feedstocks including landwaste, sea waste, plastics waste, industrial waste and residual materials from the petroleum industry, such as petroleum coke. All these carbon-based feedstocks may be harvested, dried and pelletized to uniform size comparable to standard coal feedstock specifications.

The carbon-based feedstock is pyrolized, or reacted in a zero oxygen atmosphere, at temperatures that range from about 800° C. to 1500° C. using electricity as the heat-producing source, or from about 1500° C. to 2200° C. using induction heat, or from about 1800° C.-2400° C. using plasma heating technologies. In general, higher temperatures are preferred for extraction of impurities, but these may be optimized with cost considerations for the cost of the heating vessel and energy consumption. In addition, carbon materials containing lower levels of impurities, or in which the impurities are volatile at lower temperatures, may not require higher pyrolization temperatures. Mercury, sulfur, nitrogen, and all other impurities may be removed in their gaseous, liquid or solid states, leaving an ultra-clean pure carbon, or "char". The resultant ultra-clean char, following pyrolization of any grade carbon-based feedstock material, yields uniform and highly-efficient heat values when combusted. Such uniformity is highly desirable in industrial processes.

In addition, the liquid and gaseous hydrocarbons resulting from pyrolization of the carbon-based feedstock material may be recirculated and combusted for heat and/or electricity production. Sulfur may be combined with hydrogen during pyrolization to form hydrogen sulfide, which is then further reacted according to methods known in the art to form sulfuric acid or other compounds for industrial use. In addition, a resultant first product from pyrolization is ultra-clean char, which may be combusted in the presence of pure oxygen to form heat and a gaseous exhaust of pure carbon dioxide, free of impurities such as mercury, sulfur, nitrogen, or soot and reducing the need for post-combustion scrubbing. Further, all or a portion of the gaseous exhaust stream of pure carbon dioxide may be recirculated and combusted with pure ultra-clean char to form carbon monoxide, which is then reacted with hydrogen to produce liquid hydrocarbon fuels. Moreover, all or a portion of the gaseous exhaust stream of pure carbon dioxide may be recirculated for absorption through biomass production processes to form algae or other biomass products and oxygen. All or a portion of the gaseous exhaust stream of pure carbon dioxide may be captured and redirected for sequestration by methods and for purposes known in the art. If a portion of the gaseous exhaust stream of pure carbon dioxide is exhausted into the atmosphere, the portion re-directed for other uses as described above reduces the overall exhaustion of carbon dioxide into the atmosphere.

In another embodiment of the invention, post-combustion final products slag and ash are "ultra-clean" with reduced impurities that otherwise impede efficient extraction of rare earth elements, thereby improving efficiency of extraction methods, such as solvent, surfactant and non-ionic surfactant technologies. The final post-combustion products slag and ash are more porous and more brittle than slag and ash from standard raw coal combustion processes. They are more receptive to and respond more efficiently to rare earth element extraction methods.

Using the process of the present invention, unwanted by-products formed during the pyrolization of carbon-based materials can be easily captured and recirculated, or captured and recycled, or collected and reformed, or re-used for industrial processes, or sequestered. Removing these by-products results in an ultra-clean char that may be combusted with reduced environmental impact. Further, these by-products are more easily removed during or following pyrolization than during or following combustion, thereby creating a more environmentally friendly combustible material.

The carbon containing material used in the present invention may include various classifications of coal including anthracite, bituminous and lignite coal grades; organic waste, such as land waste, sea waste, industrial waste, plastic waste and the like. The pyrolization of organic waste provides a convenient outlet for waste disposal while providing a combustible fuel material, which can be used in a conventional boiler/generator system for generating electricity or other systems known in the art.

Combustion of Ultra-Clean Char

Ultra-clean char can be combusted in the presence of oxygen to produce heat and carbon dioxide. The heat from combustion of the ultra-clean char can be converted into electricity in a conventional boiler/generator system. Combusted ultra-clean char can generate an ultra-clean ash suitable for use in an extraction process for rare earth elements. The ultra-clean char may be combusted in an integrated system to generate ultra-clean ash and heat, which is converted into electricity through a conventional boiler/generator system, and the post-combusted ultra-clean ash may be subsequently processed for the extraction of rare earth elements. Combustion of ultra-clean char in the presence of oxygen produces a by-product of ultra-clean carbon dioxide. The ultra-clean carbon dioxide may be sequestered and used in a carbon dioxide-rich combustion of ultra-clean char in a process for converting the ultra-clean char into liquid hydrocarbons and olefins. Combusting the ultra-clean char results in very little post-processing clean-up. For example, after completion of the combustion, the clean-up includes very little if any scrubbing and/or filtering. Further, reduced levels of gaseous mercury, soot or sulfur oxides are formed during combustion of the ultra-clean char. Thus, the ultra-clean char results in a very efficient combustion fuel having very little post-processing clean-up as compared to the combustion of raw coal.

Extraction of Rare Earth Elements from Ultra-Clean Ash

Ultra-clean char may be produced from the pyrolization of a raw coal product, which is further combusted in the presence of oxygen to produce heat, carbon dioxide and ultra-clean ash. The ultra-clean ash can be further processed to extract rare earth elements that are contained therein. It is known that the rare earth elements adhere to the surface of molecules found in raw coal products, and current extraction techniques result in a rare earth element extraction of about 2 percent by weight. In one embodiment, rare earth elements are extracted from an ultra-clean char coal product at greater than 2 percent by weight. The ultra-clean ash produced by processes disclosed herein is more brittle than ash resulting from the combustion of raw coal. This increase in brittleness results in the ultra-clean ash having a higher surface area when pulverized as compared to a raw coal ash. This higher surface area exposes more surface sites in the ultra-clean ash where the rare earth elements are adhering to the molecules, and provides a more suitable product for the extraction of rare earth elements. The higher surface area provides for a higher yield of the rare earth elements from the ultra-clean ash over the post-combustion product of a raw coal counterpart. Common techniques used in the art may be employed for the extraction of the rare earth elements from the ultra-clean ash. Such techniques include one or more of a solvent extraction method and an ion-exchange method. In one embodiment, ammonium sulfate is used to extract rare earth elements from the ultra-clean ash. In another embodiment, ion exchange methods are employed. After extracting rare earth elements from the ultra-clean ash, the spent ash product can be disposed of or recycled as commonly known in the art.

Production of Liquid Hydrocarbons and Olefins

In another embodiment, the ultra-clean char can be used in an integrated system for conversion to liquid hydrocarbons, such as various hydrocarbons, olefins, fuels, alcohols, greases, waxes, and the like. Such a conversion is discussed in U.S. Pat. Nos. 8,822,553 and 9,334,796, which are incorporated herein by reference. While it is understood in the art that carbon dioxide, considered to be a detrimental exhaust by-product from coal processing, can be beneficially recirculated to form liquid hydrocarbon fuels, many other important waste stream problems involved with coal processing are currently inefficiently or insufficiently resolved. Some of the unresolved problems associated with coal processing include unacceptable levels of mercury, soot and sulfur in post-combustion exhaust streams, varying levels of carbon dioxide, contamination in post-combustion exhaust scrubbing mechanisms, widely varying levels of combustion efficiency from differing grades of coal or other carbon-based feedstocks, and inefficient extraction methods for waste stream by-products including but not limited to rare earth elements and other heavy metals. The present invention provides a novel system by which multiple pre- and post-combustion waste stream problems are resolved, uniformity of heat value is made available from all carbon-based feedstocks, combustion processes perform at maximum efficiency, post-combustion exhaust streams require no scrubbing and contain no soot, and pre- and post-combustion extraction methods for usable materials including rare earth elements and other heavy metals are improved. Through the introduction of a novel shift in processing steps, namely the pyrolization of all carbon-based feedstock materials as first process step, before combustion of the feedstock material, multiple downstream reaction improvements are made possible. Some of these improvements include expansion of usable feedstocks to include any carbon-based material, the removal of waste stream materials before, during or immediately following pyrolization so that reduced impurities or waste material are present during the combustion phase of processing.

Process Flows

Figure 7:
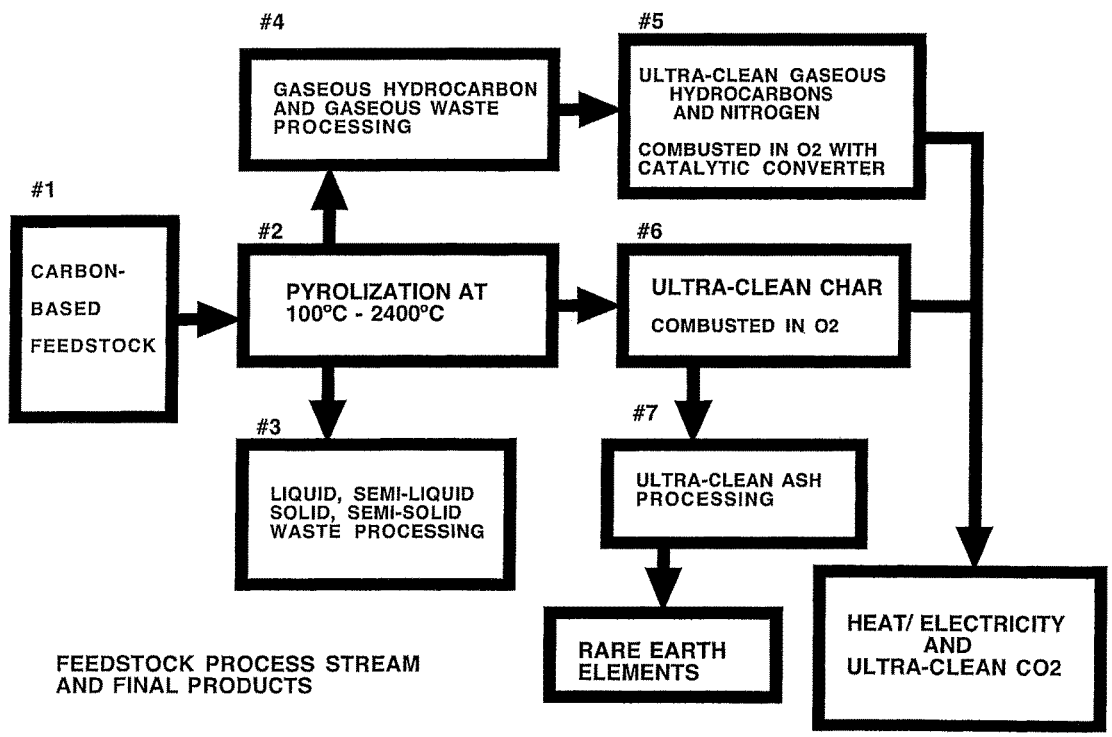
FIG. 7 illustrates the process stream in which liquid and solid waste is resolved in separate streams from gaseous materials, and in which the gaseous stream includes waste such as sulfur oxides, hydrogen sulfide and gaseous mercury as well as combustible gaseous hydrocarbons. Following waste processing, ultra-clean gaseous hydrocarbons and ultra-clean char are then combusted to produce heat (for electricity), ultraclean $CO_2$ and ultra-clean ash from which rare earth elements are extracted.

FIG. 7 illustrates the process stream in which liquid and solid waste is resolved in separate streams from gaseous materials, and in which the gaseous stream includes waste such as sulfur oxides, hydrogen sulfide and gaseous mercury as well as combustible gaseous hydrocarbons. Following waste processing, ultra-clean gaseous hydrocarbons and ultra-clean char are then combusted to produce heat (for electricity), ultraclean $CO_2$ and ultra-clean ash from which rare earth elements are extracted.

Figure 8:
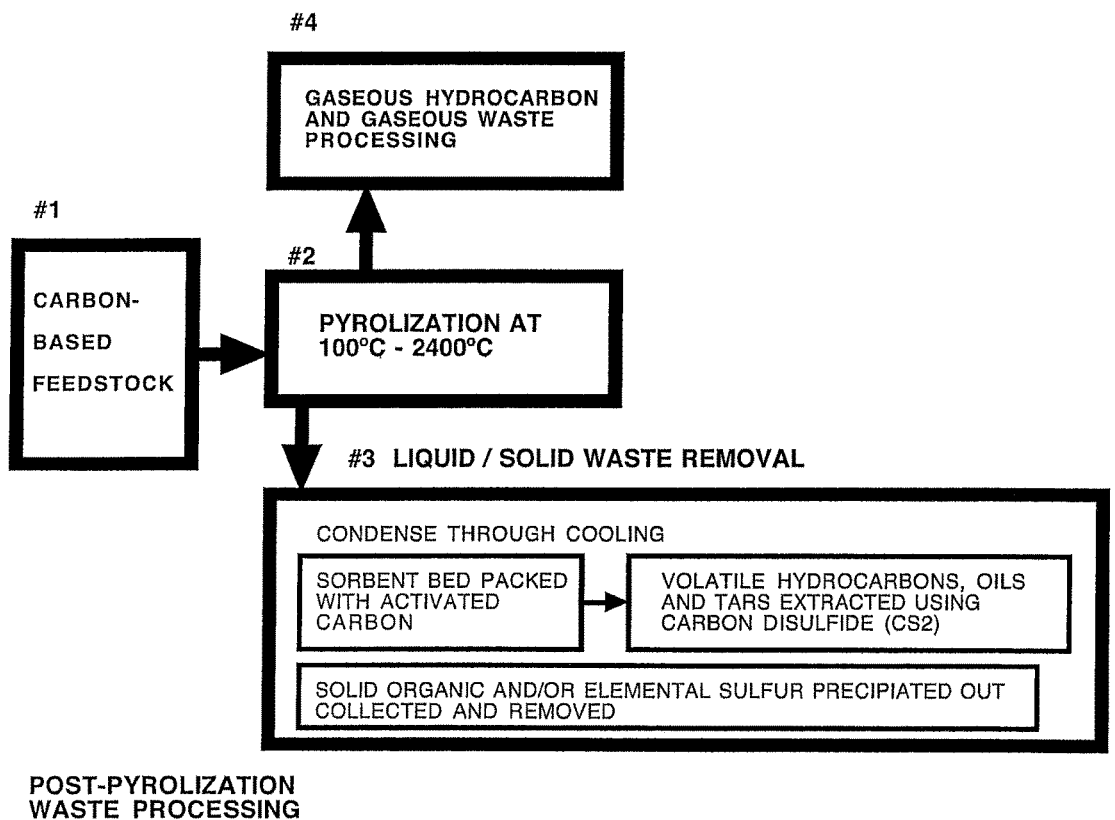
FIG. 8 illustrates the manner in which liquid, semi-liquid and semi-solid waste such as volatile hydrocarbons, oils and tars are condensed, captured and extracted and in which solid waste such as elemental and/or organic sulfur is precipitated out and collected.

FIG. 8 provides more detail of step 3 in FIG. 7, showing the manner in which liquid, semi-liquid and semi-solid waste such as volatile hydrocarbons, oils and tars are condensed, captured and extracted, and in which solid waste such as elemental and/or organic sulfur is precipitated out and collected.

Figure 9:
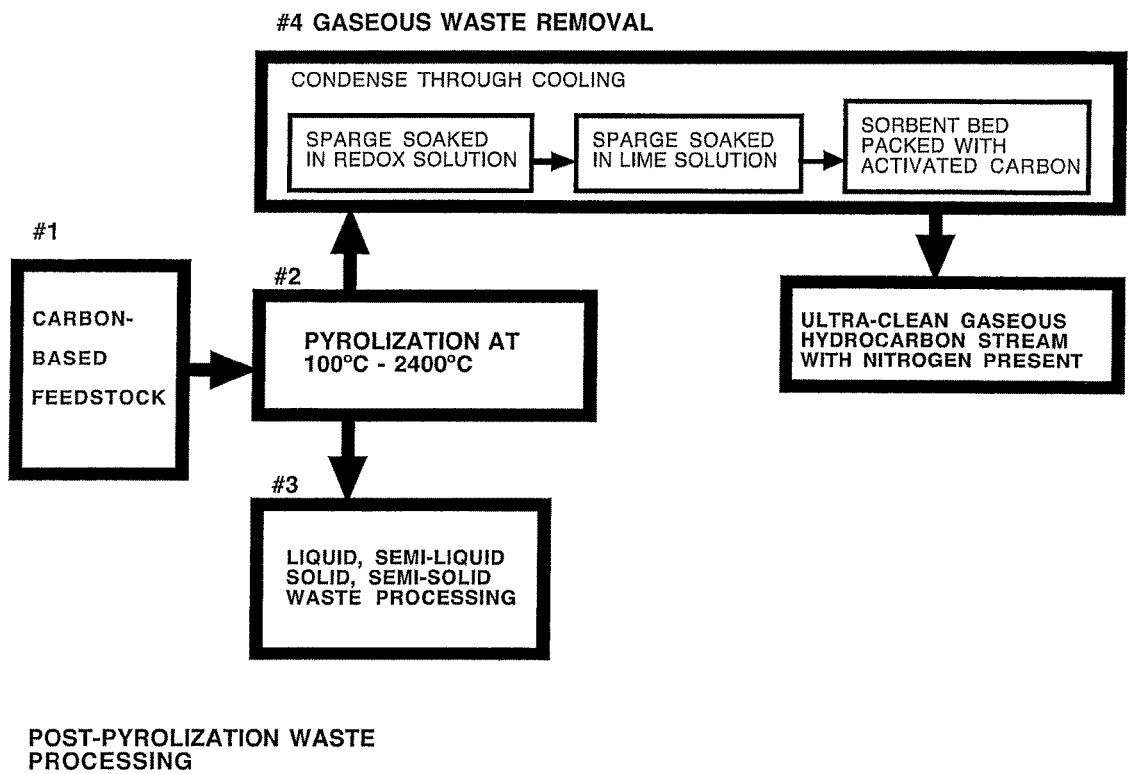
FIG. 9 illustrates the manner in which gaseous waste materials such as sulfur oxides, hydrogen sulfide and gaseous mercury are removed to yield ultra-clean combustible gaseous hydrocarbons with nitrogen present, but no nitrogen oxides.

FIG. 9 provides more detail of step 4 in FIG. 7, showing the manner in which gaseous waste materials such as sulfur oxides, hydrogen sulfide and gaseous mercury are removed to yield ultra-clean combustible gaseous hydrocarbons with nitrogen present, but no nitrogen oxides.

Figure 10:
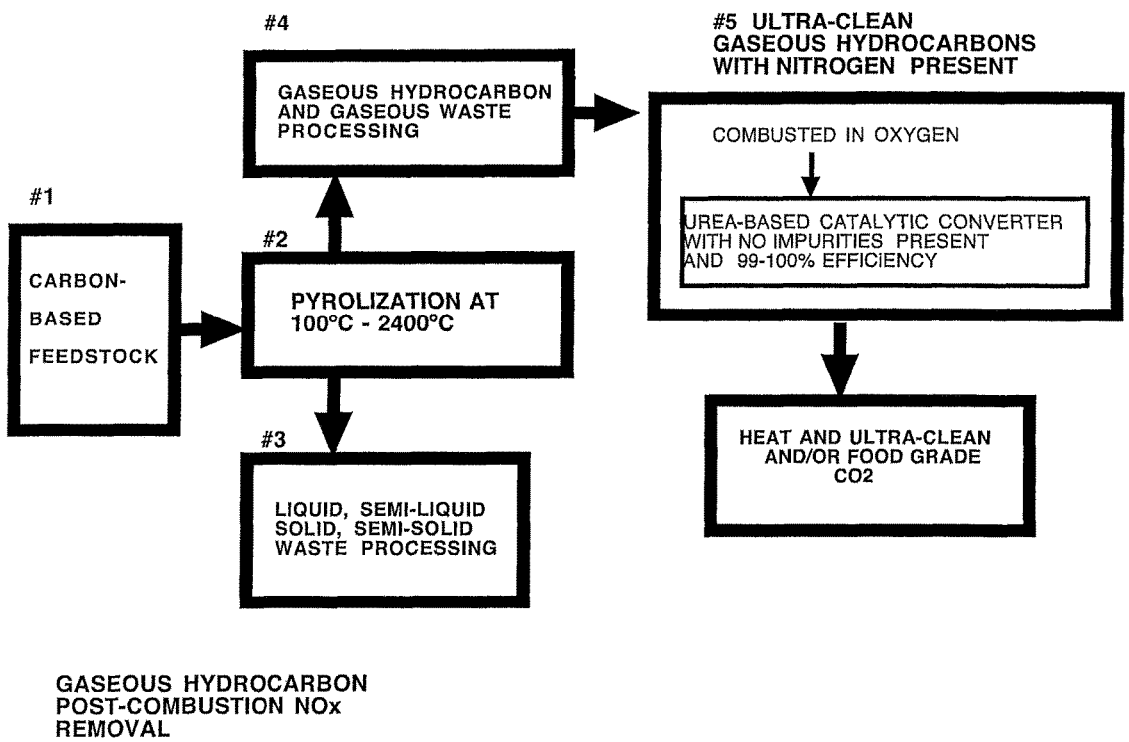
FIG. 10 illustrates the manner in which ultra-clean gaseous hydrocarbons with nitrogen present are combusted in pure oxygen and the resulting nitrogen oxide waste is removed using a urea-based post-combustion catalytic converter and the final reaction products are heat for electricity and ultra-clean and/or food grade carbon dioxide.

FIG. 10 provides more detail of step 5 in FIG. 7, showing the manner in which ultra-clean gaseous hydrocarbons with nitrogen present are combusted in pure oxygen and the resulting nitrogen oxide waste is removed using a urea-based post-combustion catalytic converter and the final reaction products are heat for electricity and ultra-clean and/or food grade carbon dioxide.

Figure 11:
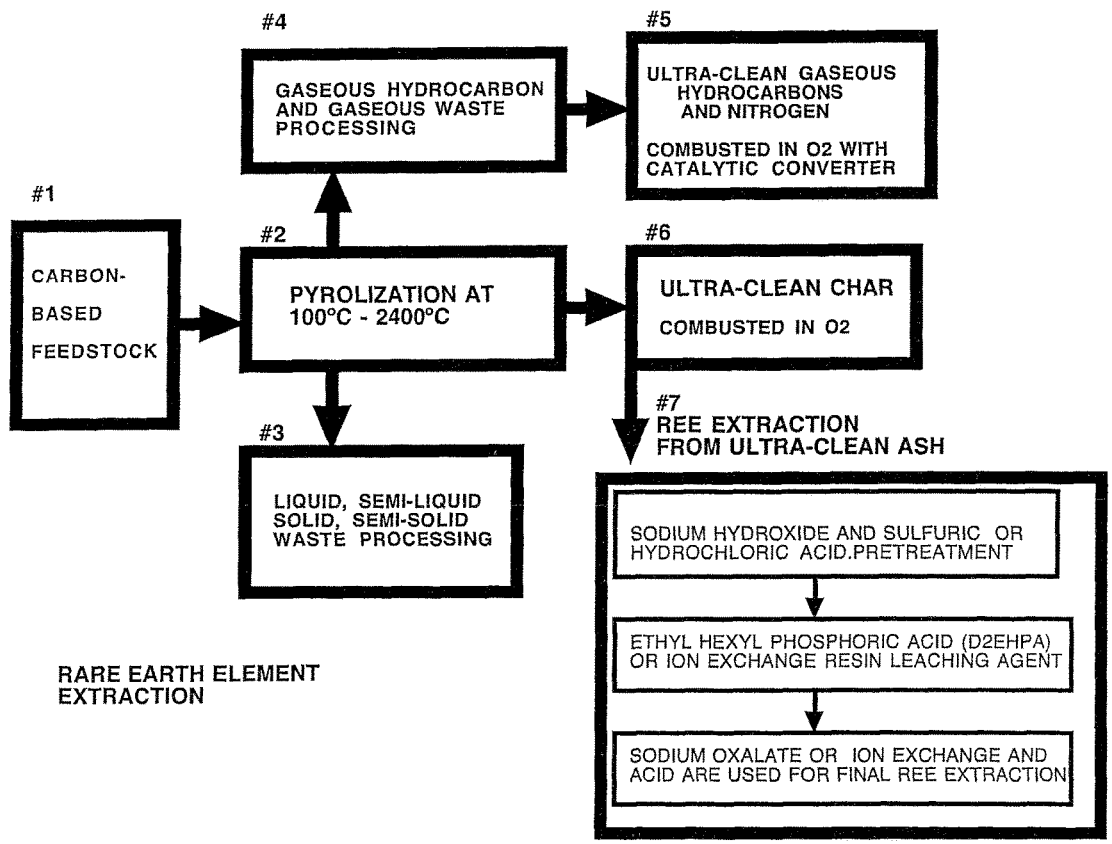
FIG. 11 illustrates the manner in which rare earth elements are extracted from ultraclean ash resulting from combustion of ultra-clean char.

FIG. 11 provides more detail of step 7 in FIG. 7, showing the manner in which rare earth elements are extracted from ultraclean ash resulting from combustion of ultra-clean char.

While the present disclosure has been illustrated by the description of exemplary embodiments thereof, and while the embodiments have been described in certain detail, it is not the intention of this disclosure to restrict or in any way limit the scope of the appended claims to such detail. Additional advantages and modifications will appear to those skilled in the art. Therefore, the disclosure in its broader aspects is not limited to any of the specific details, representative devices and methods, and/or illustrative examples shown and described. Accordingly, departures may be made from such details without departing from the spirit or scope of this disclosure's general inventive concept.

What is claimed is:

1. A method for creating and using an ultra-clean char, comprising the steps of:
    (a) pyrolizing a carbon-based material at a temperature greater than 800° C. to produce an ultra-clean char, wherein the ultra-clean char is substantially free of at least one of an impurity selected from the group consisting of mercury, sulfur and nitrogen present in the carbon-based material prior to pyrolization;
    (b) capturing hydrogen from the pyrolization for use in downstream processes, wherein the hydrogen is in the form of a gaseous hydrocarbon stream that is captured and used for downstream combustion with oxygen; and
    (c) combusting the ultra-clean char to produce energy used for the pyrolization.

2. The method of claim 1, wherein the gaseous hydrocarbon stream contains an impurity selected from the group consisting of sulfur oxides, hydrogen sulfide, mercury and nitrogen.

3. The method of claim 2, wherein the gaseous hydrocarbon stream is cooled for removal of an impurity.

4. The method of claim 3, wherein sulfur oxides are removed using a sparge soaked in a redox solution.

5. The method of claim 4, wherein the redox solution is anthraquinone-2, 7-disulfonic acid disodium salt.

6. The method of claim 3, wherein hydrogen sulfide is removed using a sparge soaked in a lime solution.

7. The method of claim 6, wherein the lime solution is 5%-15% lime (CaO) and 95% to 85% water.

8. The method of claim 3 wherein mercury is captured using a sorbent bed.

9. The method of claim 8, wherein the sorbent bed is packed with activated carbon.

10. The method of claim 2, wherein the gaseous hydrocarbon stream with nitrogen present is combusted in pure oxygen to yield heat, $CO_2$ and nitrogen oxides (NOx).

11. The method of claim 10, wherein the nitrogen oxides (NOx) are removed using a post-combustion catalytic converter.

12. The method of claim 11, wherein the post-combustion catalytic converter uses urea to react with the nitrogen oxides.

13. The method of claim 11, wherein the final products after removal of impurities and combustion of the gaseous hydrocarbon stream are heat and ultra-clean $CO_2$.

14. The method of claim 13, wherein at least some of the heat from combustion of the gaseous hydrocarbon stream is used to produce electricity.

15. The method of claim 1, wherein at least some of the energy from combustion of the ultra-clean char is used to produce electricity.

16. The method of claim 13 further comprising the steps of:
    (a) capturing the ultra-clean $CO_2$ from combustion of at least one of the ultra-clean char and the ultra-clean gaseous hydrocarbons: and
    (b) redirecting the ultra-clean $CO_2$ for use in a process selected from the group consisting of organic fuel production, biomass production, sequestration, industrial packaging, pharmaceutical packaging, food product packaging, liquid food product carbonation, and producing pure $CO_2$ for industrial use.

17. The method of claim 1, further comprising the steps of:
    (a) pulverizing the ultra-clean ash produced from the combustion of ultra-clean char; and
    (b) extracting rare earth elements from the pulverized ultra-clean ash.

18. The method of claim 17, wherein the rare earth elements present in the ultra-clean ash are selected from the group comprising: cerium, dysprosium, erbium, europium, gadolinium, lutetium, praseodymium, samarium, terbium, thulium, ytterbium, and yttrium.

19. The method of claim 18, wherein the rare earth element concentration from the ultra-clean ash exceeds 300 parts per million.

20. The method of claim 17, wherein the rare earth element extraction is accomplished by pre-treating the pulverized ultra-clean ash with a sodium hydroxide hydrothermal reaction.

21. The method of claim 20, further comprising the steps of:
   a) using dilute sulfuric acid (liquid bis(20ethylhexyl) phosphoric acid (D2EHPA) as a leaching reagent for separation of at least one rare earth element from the ultra-clean char; and
   b) precipitating at least one rare earth element from the leaching reagent.

22. The method of claim 21, wherein an ion exchange resin DOWEX™ 50WX8 (100-200 mesh) is used to extract the rare earth element from the leaching reagent, and the rare earth element is removed from the ion exchange resin using an acid.

23. The method of claim 1, wherein the pyrolization is at temperatures less than 1000° C.

24. The method of claim 23, wherein the pyrolization is at temperatures between 100° C. and 1000° C.

25. The method of claim 1, wherein the pyrolization is at temperatures greater than 1500° C.

26. The method of claim 25, wherein the pyrolization is at temperatures between 1500° C. and 2400° C.

27. The method of claim 1, wherein the carbon-based material includes lightweight plastics.

28. The method of claim 1, wherein the carbon-based material includes tires.

* * * * *